Figure 1:
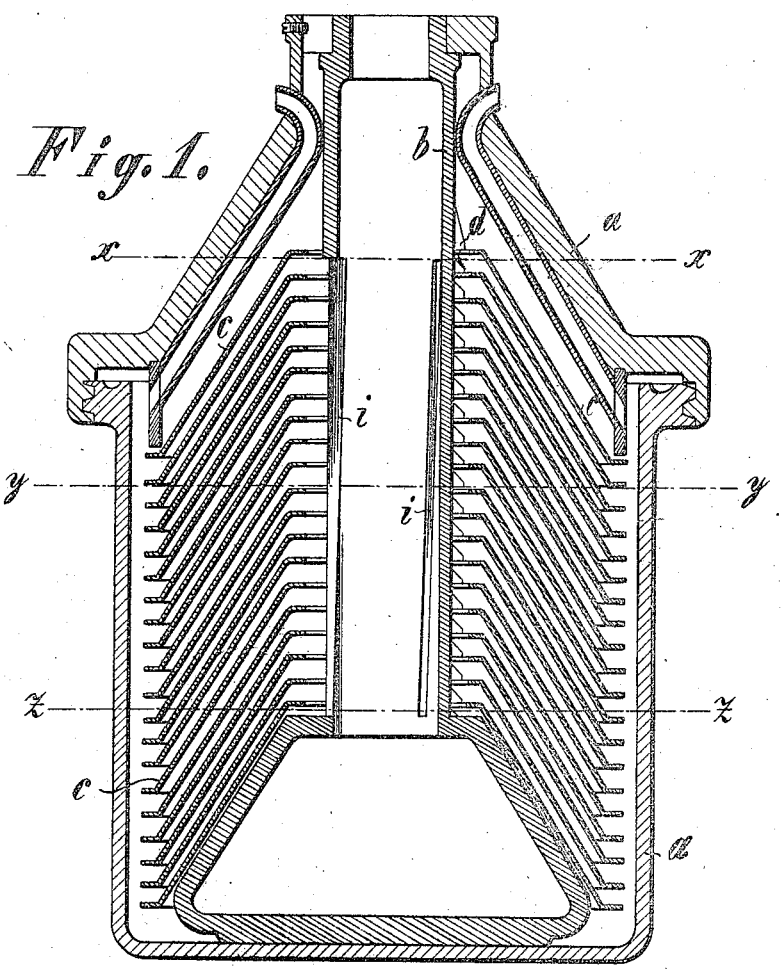

UNITED STATES PATENT OFFICE.

CARL BERGNER, OF SANDE, NEAR BERGEDORF, NEAR HAMBURG, GERMANY.

CENTRIFUGAL MILK-SEPARATOR.

No. 853,054.　　　　Specification of Letters Patent.　　　Patented May 7, 1907.

Application filed August 7, 1905. Serial No. 273,135.

*To all whom it may concern:*

Be it known that I, CARL BERGNER, director of the Bergedorfer Eisenwerk, a citizen of the German Empire, residing at Sande, near Bergedorf, near Hamburg, Germany, have invented certain new and useful Improvements Relating to Centrifugal Milk-Separators, of which the following is a specification.

A great disadvantage which has been experienced in centrifugal machines having a central milk inlet tube and inserted plates, consists in that the new milk coming from the inserted tube is not equally distributed on all the inserted plates, its greater part flowing out at the lower part of the central tube, so that the upper inserted plates are fed only a little or not at all. To avoid this disadvantage many means have been proposed; for instance, the reduction of the lower part of the central tube, the provision of insertions etc., but not one of these auxiliary means have fulfilled their purpose completely, partly owing to the complicated nature of the arrangement proposed that rendered the construction of the centrifugal drums expensive and the cleaning of the tubes difficult.

The device to which this invention relates effects the object in the simplest possible manner by means of a peculiar contruction of the outlet slit, in consequence of which the milk, whenever it is desired to do so, or whenever it is required by the proportions and conditions of operation of the drum used its size and height, whether it is operated by hand or machinery, can be stowed in the inlet pipe until its surface is level with the upper edge of the slit, whereupon it is made to pass out of the pipe under greater or less pressure. By means of this new device it becomes possible, if it is desired, to force a larger quantity of milk through any arbitrarily chosen part of the slit, and consequently to supply particular plates with larger quantities of milk than is supplied to others. The desideratum aimed at is, of course, the most uniform distribution of the milk to all the plates; to cause a larger than the ordinary quantity of milk to flow out of the upper part of the drum, and consequently to supply the plates inserted in the upper part with more milk is only under exceptional circumstances desirable.

In designing the slit the object aimed at was to counteract the natural tendency of the milk to pass in a larger volume through the slit in the lower part of the pipe. This is effected by giving to the central plane, which is assumed to cut the longitudinal axis of the slit, the form of a left-handed spiral or screw, in such a manner that the direction of the slit in the lower part of the central inlet pipe seems to correspond to the direction of rotation of the drum, while it appears to run in the opposite direction in the upper part of the pipe.

Figure 3:
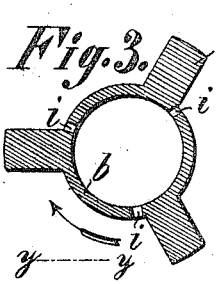
Figure 4:
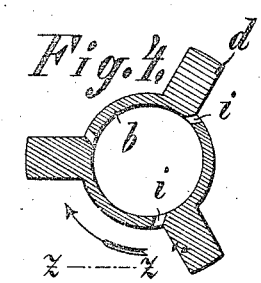

In the accompanying drawing, Figure 1 is a vertical longitudinal section through a drum $a$ with a central inlet pipe $b$ and plates $c$. Slits $i$ running spiral-like upward are formed at the foot of the projections $d$ in that side of the inlet pipe $b$ which corresponds to the direction of rotation. The spiral character of the slit is made plain by the three sections shown in Figs. 2, 3 and 4. The sample of separator drum, chosen to illustrate the invention, is provided with a sediment collector; slits constructed in accordance with this invention can however, be formed in continuation with all drums provided with a central inlet pipe and having plates inserted therein.

Figure 2:
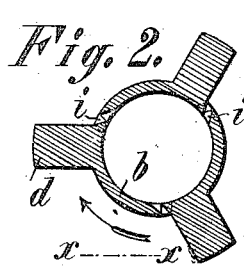

In the upper part of the central inlet pipe, that is to say, the part which supplies the uppermost rows of plates, the slit runs through the wall of the pipe in a direction opposite to the direction of rotation of the drum in such a manner that its back inner edge has a ridge-shaped cross section, as shown in Fig. 2. The effect of this arrangement is that the back inner edge of the slit peels a thin film from the cylinder of milk rotating within the central inlet pipe, an effect due to the greater velocity of the pipe compared with that of the cylinder of milk within. Consequently the milk trying to pass through the slit is subjected to more than ordinary pressure, with the result that a more compressed jet of milk flows into the spaces between the uppermost rows of plates. The section shown in Fig. 3, which corresponds to a section through the middle portion of the perforated part of the pipe, shows the nearly radial direction of the slit in this part of the pipe. While the slit runs in this direction its edges do not affect the cylinder of milk within the pipe in any manner whatever. In its downward course the longitudinal axis of the slit becomes still further turned to the left, until the direction of the slit in the lower part of the pipe is that shown in Fig. 4, that is to say, it corresponds to the direction of rotation. In this case the back inner edge of the slit forms an obtuse angle, which does not affect the cylinder of milk formed concentrically, within the central inlet pipe in the manner referred to above, but on the contrary, tends to stop its flow, as a great part of the milk glides over the blunt back edge of the slit, while only much smaller quantities than enter the slit in the middle and upper portion of the pipe, pass through it.

The retarding effect of the slit on the cylinder of milk in the lower part of the pipe decreases gradually and ceases altogether in that part of the slit formed in the middle part of the inlet pipe. On the other hand, the tendency of the slit to peel a thin film from the cylinder of milk increases gradually throughout the upper part of the slit and reaches its maximum intensity at the uppermost end of the slit, as shown in Fig. 2.

The choice of the proper spot where the slit ceases to receive a storing effect on the cylinder of milk depends largely on the height of the drum used. If the drums are very high, more than half the slit may be allowed to participate in it, because if that is done, the inner girdle of milk is forced upward until it is level with the upper end of the slits. In the case of lower drums, such as are principally manipulated by hand, it is best to have a somewhat flatter spiral for the longitudinal axis of the slit. In any case, the device of giving to the longitudinal axis of the slit a spiral shape makes it possible so to regulate the outflow of the milk that the latter always reaches up to the upper end of the central inlet pipe, and flows out of the upper end of the slit in an equally compact jet, than out of the lower end, an effect due to the fact that the tendency of the upper end of the slit to peel a film from the cylinder of milk effects the same result as the greater pressure on the lower portion of the interior column of milk.

Having now particularly described and ascertained the nature of my said invention and in what manner the same is to be performed, I declare that what I claim is:

A centrifugal milk separator embodying an inlet tube provided with a plurality of slots arranged in parallelism with respect to the axis of the tube, the walls at the extremities of each of the slots extending in an opposite direction with respect to each other so that the slot throughout its length extends substantially in the form of a spiral.

In testimony whereof I have hereunto set my hand in presence of two subscribing witnesses.

CARL BERGNER.

Witnesses:
OTTO W. HELLMRICH,
IDA CHRIST. HAFERMANN.